United States Patent [19]

Niinomi et al.

[11] Patent Number: 4,640,663
[45] Date of Patent: * Feb. 3, 1987

[54] BALANCER AND CONTROLLING METHOD THEREOF

[75] Inventors: Tatsuya Niinomi, Yokohama; Hiroshi Kikuchi, Hiratsuka, both of Japan

[73] Assignee: Hitachi, Ltd., Tokyo, Japan

[*] Notice: The portion of the term of this patent subsequent to Sep. 17, 2002 has been disclaimed.

[21] Appl. No.: 557,430

[22] Filed: Dec. 2, 1983

[30] Foreign Application Priority Data

Dec. 13, 1982 [JP] Japan .................. 57-216801

[51] Int. Cl.$^4$ ............................................. B66C 23/00
[52] U.S. Cl. ......................................... 414/730; 901/8; 901/9; 901/48; 901/49
[58] Field of Search ............... 414/5, 730, 719; 901/5, 901/9, 48, 49, 6, 8, 45

[56] References Cited

U.S. PATENT DOCUMENTS

| 2,846,084 | 8/1958 | Goertz et al. | 901/48 X |
|---|---|---|---|
| 3,145,333 | 8/1964 | Pardini et al. | 901/46 X |
| 3,824,674 | 7/1974 | Inoyama et al. | 901/45 X |
| 3,845,284 | 10/1974 | Taguchi et al. | 901/9 X |
| 3,993,166 | 11/1976 | Senour | 414/633 X |
| 4,177,002 | 12/1979 | Motoda et al. | 414/751 |
| 4,264,266 | 4/1981 | Trechsel | 901/49 X |
| 4,283,764 | 8/1981 | Crum et al. | 901/48 X |
| 4,541,770 | 9/1985 | Niinomi et al. | 414/730 |

FOREIGN PATENT DOCUMENTS 365503 1/1982 Fed. Rep. of Germany .
2095644 10/1982 United Kingdom ............ 901/9

OTHER PUBLICATIONS

*Structured Light Method*, Y. Nakagawa and T. Ninomiya, Paper Presented at 1st Int'l. Symposium on Robot Research, Bretton Woods, N. H., 8/20-9/2, 1983.

Primary Examiner—Carlton R. Croyle
Assistant Examiner—Theodore W. Olds
Attorney, Agent, or Firm—Beall Law Offices

[57] ABSTRACT

A robot balancer (2) and a method for controlling the balancer is disclosed which has a step or a force sensor (10) mounted on the tip of the arm (3) of the balancer (2), a step or an operational means (21) for calculating the velocity of the balancer from the force given by the force sensor, and a step or a control means (15) for controlling a velocity of the balancer (2) in response to a signal from the force sensor.

20 Claims, 5 Drawing Figures ial stick is

BALANCER AND CONTROLLING METHOD THEREOF

TECHNICAL FIELD

This invention relates to a balancer for handling a heavy article and the method of controlling the balancer. More particularly, this invention relates to a balancer and a controlling method therefore suitable for enhancing the operation of a robot of the type designed for handling light loads to enable the robot to handle heavy articles.

BACKGROUND ART

The need for an automation in small lot production where a large variety occurs between lots, has increased year-by-year and production lines have been automated by robots having a flexibility in dealing with various kinds of tasks and making frequent change between tasks. Automation of assembly processes for heavy articles with robots has been slow because any advantage gained by automation is small in comparison with the cost of a robot suitable for handling heavy articles.

Therefore, as shown in Japanese Patent Applications Nos. 160789/80 and 173016/81, assembly systems for heavy articles have had to be developed. These systems economically use an inexpensive balancer in conjunction with a robot of the type normally used for handling light loads. Typically in such systems, a rotary member of a potentiometer is connected to an operation stick and a conventional balancer controlled by a velocity instruction is instructed to rotate the rotary member through a particular angle. The operational stick is mounted on the tip of the arm of the balancer and rotated by a human operator. There is a problem with such arrangements, however, because the response characteristic of a robot and a balancer and between various kinds of robots are different from each other, particularly in the mechanisms and methods for driving the robots. Therefore, when a balancer is operated in cooperation with a robot, there is no assurance that the balancer and the robot will move in the same way in response to the same velocity instruction. Excessive forces operate at the junction of the balancer and the robot to restraint displacement of the balancer relative to the robot because of differences in relative velocities occuring due to the difference between their response characteristics.

STATEMENT OF THE INVENTION

It is an object of the present invention to provide a balancer and a method for controlling it which provide a robotbalancer cooperation system that is particularly suitable for use with conventional robots.

A characterizing feature of this invention resides in a method and a balancer including a step using a force sensor mounted on the tip of the arm of the balancer to provide an indication of the forces occurring there, a step using circuit means for determining a velocity of the balancer according to the value of the force detected by the force sensor, and a step using control means for regulating the velocity of the balancer.

DETAILED DESCRIPTION OF THE INVENTION

Figure 1:
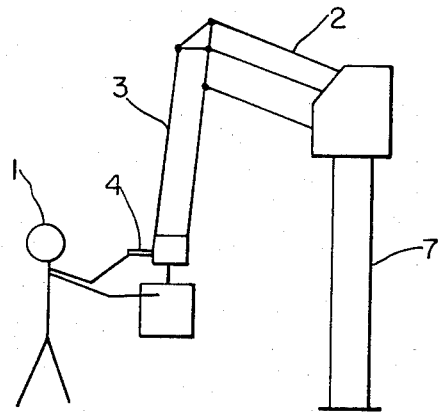
FIG. 1 is an explanatory illustration of one conventional balancer controlled by a human operator.
Figure 2:
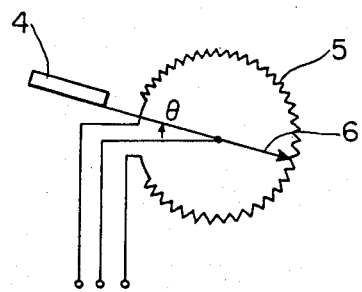
FIG. 2 illustrates the function of an operation stick for a conventional balancer.

As shown in FIGS. 1 and 2, a conventional balancer 2 for a robot (not shown), has an arm 3 and is mounted upon a base 7. Balancer 2 is controlled by a velocity instruction value, and may be instructed to rotate through an angle $\theta$, by a rotary member 6 of a potentiometer 5 connected to an operational stick 4. Operational stick 4 is mounted on the tip of arm 3 of balancer 2 and is rotated by a human operator 1. There is a problem with such arrangements, however, because the response characteristics of robots and balancers are different from each other, particularly in their mechanisms and methods for driving the robots. Therefore, when a balancer is operated in cooperation with a robot, there is no assurance that the balancer and the robot will move in the same way in response to the same velocity instruction. Excessive forces operate at the junction of the balancer and the robot to restraint displacement of the balancer relative to the robot because of differences in relative velocities occurring due to the differences between their response characteristics.

Therefore, to obtain cooperative movement between any kind of robot and any kind of balancer, it is necessary for them to have a function for correcting the difference in their relative velocities or their relative displacements and a function for detecting the force caused by the difference in any resulting relative displacement to deal with abnormal situations when the force detected exceeds a tolerance level. These functions are not currently installed in either conventional balancers or in conventional robots.

Figure 3:
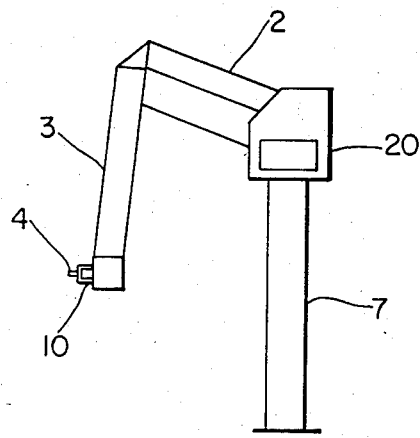
FIG. 3 illustrates one embodiment of this invention.
Figure 4:
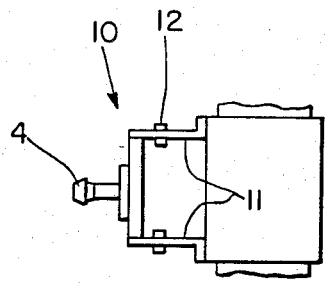
FIG. 4 is an enlarged view of a tip portion of the arm of FIG. 3.

One of the embodiments of this invention is explained below by reference to FIGS. 3 and 4. This embodiment, as shown in FIG. 3, includes a balancer body 2, an operational stick 4 having a force sensor 10 mounted on the tip of a balancer arm 3, and a control apparatus 20. The balancer is mounted upon a base 7. The balancer body 2 may be the same as the balancer described in the Japanese Patent Applications 160789/80 and 173016/81 mentioned earlier herein.

Force sensor 10 includes a parallel plate spring 11 having strain gauges 12 on its surface and detects the force added to operational stick 4 by sensing the bend of a parallel plate spring 11. The operation stick 4 is grasped by a robot (not shown) and forms a junction between the balancer and the robot in their cooperational operation. This operational stick 4 can be held by a human operator when the operator uses the balancer.

When balancer 2 is operated in cooperation with a robot, the robot grasps the operational stick 4 of balancer 2 and moves while sending a velocity instruction to balancer 2. As the movement of the balancer 2 in a horizontal direction is performed under the force of the robot, the instruction given to the balancer 2 is related to the velocity of the balancer in a vertical direction. The balancer 2 drives the arm 3 in the same direction as the robot moves and at the same time detects the difference in the velocity indicated by signals from the force sensor 10 to correct the velocity of the balancer and thereby follow the robot.

Figure 5:
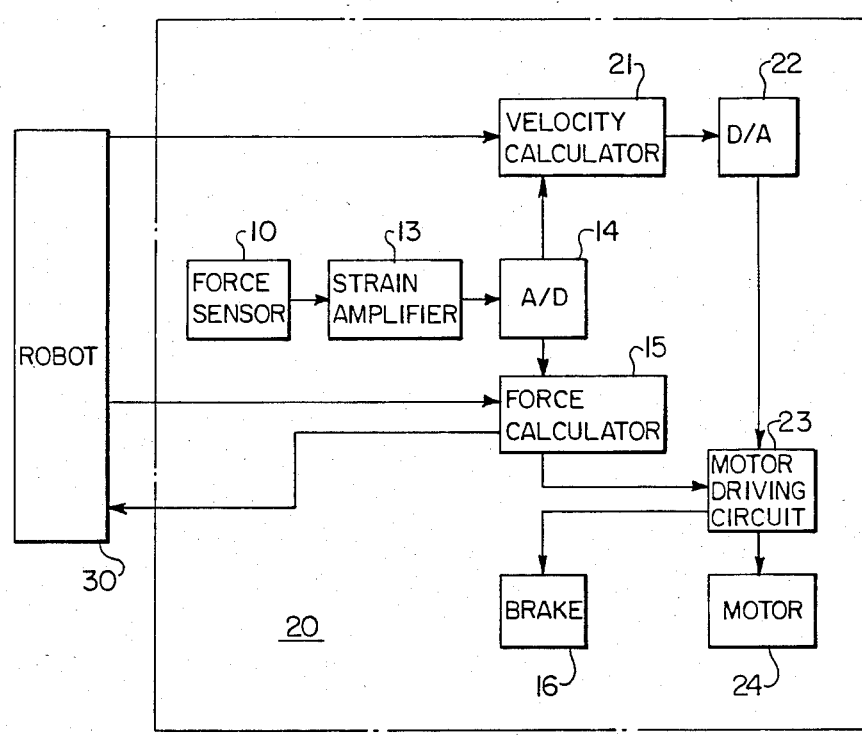
FIG. 5 is a block diagram of an apparatus for controlling one embodiment of this invention.

The control means is explained below by reference to FIG. 5. The control apparatus 20 for the balancer 2 takes the velocity instruction from a robot 30 into a balancer-velocity calculator 21, converts the velocity instruction into a velocity instruction value to the balancer by multiplying the velocity instruction by a suitable coefficient, and applies the velocity instruction value for a motor driving circuit 23 for balancer 2 via a digital-to-analog convertor 22. The motor driving circuit 23 drives a motor 24 at a predetermined speed.

Concurrently, as the balancer moves with the robot, a signal proportional to the relative displacement between them is sent from force sensor 10 of operational stick 4, which is at the junction between them, to balancer-velocity calculator 21 through strain amplifier 13 and analog-to-digital convertor 14. From this signal, balancer-velocity calculator 21 does calculations such as proportion, differential calculus, integral calculus and such calculations to generate a correct velocity value of balancer 2 referring to various conditions such as speed limits and potential interferences. A new velocity instruction is calculated by adding the instruction value to the correct velocity value. This enables the balancer to follow robot 30 by applying the new velocity instruction to motor driving circuit 23 through digital-to-analog convertor 22.

While the system is working, an excessive force may accidentally occur at the junction between the balancer and the robot because, under a particular loading, an obstruction or an interference prevents their movement to a predetermined place. To prevent the occurrence of such an excessive force, an output signal from force sensor 10 is sent to force calculator 15 through strain amplifier 13 and analog-to-digital convertor 14. Force calculator 15 determines, by comparing the output signal from force sensor 10 with a predetermined standard value, whether the force loaded at the junction exceeds the capacity of either robot 30 or balancer 2. In case of over-loading, a signal is sent from force calculator 15 to motor driving circuit 23 to stop motor 24 and operate brake 16 so that the movement of balancer 2 is stopped. The signal is also sent to robot 30 to stop the movement of robot 30 and release operational stick 4.

By installing the foregoing network in balancer control apparatus 20, a system for handling a heavy article may be easily constructed having a balancer employed in combination with various types of robots.

It is possible to use the balancer as a conventional component because force sensor 10 outputs the same instruction signal as the signal conventionally given by standard potentiometer 5 when an operator applies an upward or downward pressure to operational stick 4.

According to the invention described above, it is possible for a plurality of robots to optionally cooperate with a common balancer for handling work so that a system for handling heavy articles may be thereby economically constructed to promote automation in a large variety of small lot production processes.

We claim:

1. A method of controlling a balancer, comprising the steps of:
 receiving a first instruction for controlling movement in a vertical direction of the arm of a balancer;
 moving said arm according to said first instruction while the distal end of said arm is subjected to external forces;
 detecting a force added to the arm along said vertical direction with a force sensor mounted on the distal end portion of the arm;
 determining a velocity instruction for the balancer in response to the first signal and directing the distal end of the balancer to follow movement indicated by said external forces by modifying said velocity instruction with a second signal derived from the force sensor; and
 applying said velocity instruction to control the velocity of the balancer.

2. The method of claim 1, further comprising the steps of activating a brake to stop movement of the balancer when the force sensor detects a force larger than a predetermined value.

3. The balancer of claim 5, wherein said control means includes a velocity calculator for generating said velocity instruction in response to reception of said first instruction for the balancer from a robot and said signal from said force sensor.

4. The balancer of claim 3, further comprising:
 a force calculator for detecting an overload at the junction between said balancer and the robot by comparing said signal to a predetermined value, and for generating an overload signal when said signal exceeds said predetermined value;
 a brake for stopping said drive means; and
 a drive circuit coupled to said velocity calculator and said force calculator for operating said drive means in response to reception of the velocity instruction sent from said velocity calculator, and for activating said break in response to reception of said overload signal.

5. A balancer, comprising:
 a base;
 an arm member pivotally mounted on said base to hold an article;
 means for receiving a first instruction directing movement of said arm member in a vertical direction;
 drive means for actively moving said arm member in response to said first instruction;
 a sensor suitable for being grasped and actively moved by forces external to said drive means, mounted on the end portion of said arm for detecting a force added vertically to said arm by said external forces while said sensor is grasped and for generating a signal having a value proportional to the value of the force detected; and
 control means for determining a velocity instruction for said arm member from said first instruction and minimizing the magnitude of said added force by modifying said first instruction in response to the signal generated by said force sensor and applying the velocity instruction to control said drive means.

6. The balancer of claim 5, wherein said sensor includes graspable means for forming a connection to a robot and said sensor is interposed between said graspable means and said arm for sensing said added force.

7. The balancer of claim 5, wherein said force sensor includes a strain gauge and a plate, said strain gauge being fixed on said plate.

8. The balancer of claim 5, wherein said force sensor includes four strain gauges and two plates, and each of said strain gauges is fixed on the both sides of the plates.

9. The balancer of claim 5, further comprising:
 means connected to said force sensor and graspable by a robot when the balancer is operated in cooperation with said robot, for forming a junction between said robot and said arm member.

10. The balancer of claim 5, wherein said control means has safety means connected with the force sensor to receive said signal, for detecting a force added to the arm whereby said safety means is able to control said drive means and the balancer is stopped when the force sensor detects a force larger than a predetermined value.

11. A balancer operable in cooperation with a robot, comprising:
   a base;
   an arm member pivotally mounted on said base to hold an article;
   drive means for moving said arm member;
   a force sensor mounted on the end portion of said arm for detecting a force added vertically to said arm by the robot and for generating a signal representative of the magnitude of said force;
   means connected to said arm by said force sensor for forming a junction with the robot; and
   means of controlling said drive means, including:
   a velocity calculator for receiving a velocity signal from the robot for directing movement of said arm in a vertical direction, and a force signal from said force sensor, and for determining and applying to said drive means a velocity instruction for minimizing the magnitude of said vertically added force while following movement of the robot in response to reception of said force signal by modifying the value of said velocity instruction;
   a force calculator for detecting an overload at said junction by comparing said force signal to a predetermined value and for generating an overload signal when the value of said signal exceeds said predetermined value;
   a brake for stopping said drive means;
   a drive circuit coupled to said velocity calculator and said force calculator for operating said drive means in response to reception of the velocity signal sent from said velocity calculator and for activating said brake in response to reception of said overload signal.

12. The balancer of claim 11, wherein said force sensor separates said junction forming means from said arm.

13. The balancer of claim 12, wherein said force sensor further comprises:
   a plurality of horizontally disposed members having spaced apart proximal ends attached to said arm;
   means for joining the distal ends of said members; and
   means positioned on opposite horizontal surfaces of said members for sensing deformation of said horizontal members.

14. The balancer of claim 13, wherein said junction forming means is attached to said joining means.

15. A balancer operable in cooperation with a robot, comprising:
   a base;
   an arm member pivotally mounted on said base to hold an article;
   drive means for moving said arm member;
   means for receiving a first instruction for directing movement of said arm member by said drive means;
   control means for determining a velocity instruction for said arm member from said first instruction and for applying the velocity instruction to control said drive means; and
   a sensor suitable for being grasped, mounted on the distal end portion of said arm for detecting a force added vertically to said arm while said sensor is grasped and for providing to said control means a signal having a value proportional to the value of the force detected;
   whereby said control means determines a corrected velocity instruction for said arm member from the first instruction and the signal generated by said force sensor and applies the corrected velocity instruction to control said drive means.

16. The balancer of claim 15, wherein said control means includes a velocity calculator for receiving said first instruction for the balancer from the robot and the signal from said sensor, and for determining and applying said corrected velocity instruction to said drive means in response to a reception of said first instruction and said signal.

17. The balancer of claim 16, further comprising:
   force calculator means for detecting an overload at the junction between the robot and said sensor while said sensor is grasped by the robot, for detecting an overload at said junction by comparing said signal to a predetermined value and for generating an overload signal when the value of said signal exceeds said predetermined value;
   a break for stopping said drive means; and
   a drive circuit coupled to said velocity calculator and said force calculator means for operating said drive means in response to reception of the corrected velocity instruction sent from said velocity calculator means, and for activating said break in response to reception of said overload signal.

18. A balancer operable in cooperation with a robot, comprising:
   arm means having one extremity providing a first terminus pivotally connectable to a base and a second extremity forming a distal terminus portion, for holding an article;
   drive means for moving said arm means;
   graspable sensor means mounted at said distal terminus portion, for responding to force added to said arm means while said sensor is grapsed by the robot, by generating a correction signal having a value proportional to the value of one component of the force added to said arm means; and
   control means for receiving an electrical signal providing a first instruction and causing said drive means to move said arm in response to said first instruction, and generating a corrected instruction for controlling said drive means in response to reception of said electrical signal and said correction signal.

19. The balancer of claim 18, wherein said control means includes a velocity calculator for receiving the electrical signal from the robot and the correction signal from said sensor means, and for determining and applying said correction signal to said drive means in response to reception of said electrical signal and said correction signal.

20. The balancer of claim 19, further comprising:
   a force calculator for detecting an overload at the junction between the robot and said sensor means by comparing said correction signal to a predetermined value, and for generating an overload signal when the value of said correction signal exceeds said predetermined value;
   a brake for stopping said drive means; and
   a drive circuit coupled to said velocity calculator and said force calculator for operating said drive means in response to reception of the corrected instruction, and for activating said brake in response to reception of said overload signal.

* * * * *